(No Model.)

J. R. ROOKS.
COAL TUB.

No. 303,051. Patented Aug. 5, 1884.

Witnesses:
John E. Hayes
Patrick J. Healey

Inventor:
Julius R. Rooks

UNITED STATES PATENT OFFICE.

JULIUS R. ROOKS, OF BOSTON, MASSACHUSETTS.

COAL-TUB.

SPECIFICATION forming part of Letters Patent No. 303,051, dated August 5, 1884.

Application filed May 10, 1884. (No model.)

*To all whom it may concern:*

Be it known that I, JULIUS R. ROOKS, of the Charlestown district of Boston, county of Suffolk, and State of Massachusetts, have invented certain special Improvements in Coal-Tubs, of which the following is a specification.

My invention relates to an improvement on the tubs used in coal-discharging service.

Said improvement consists of wheels to be attached to the tub, and relates also to the peculiar manner of attaching them, as hereinafter described, and as shown in the accompanying drawings.

Figure 1:
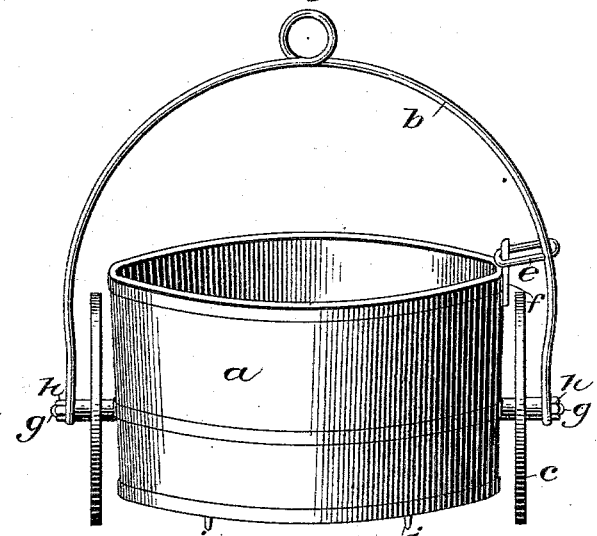
Figure 2:
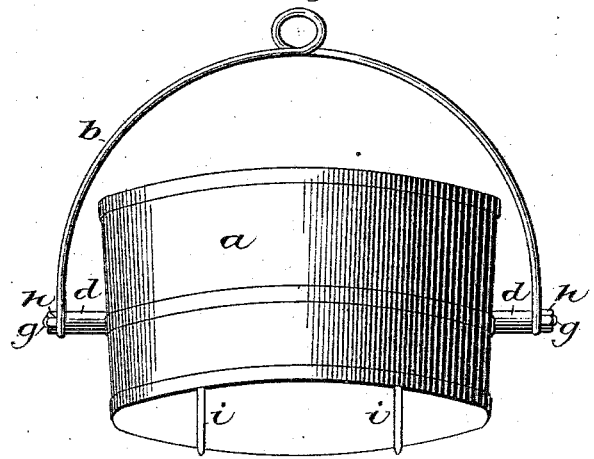
Figure 3:
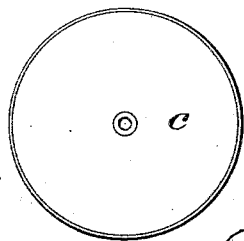
Figure 4:

Figure 1 is a front view of a wooden coal-tub with the wheels attached thereto in accordance with my invention. Fig. 2 is a similar view of the tub without the wheels. Fig. 3 is a detached view of one of the wheels. Fig. 4 is a similar view of the washer.

A represents the body part of a wooden coal-tub.

B represents the iron bail of said tub.

C represents a wheel made of a single piece of wood, with a hole bored in the center and lined with iron, to form the hub of the wheel, as shown in Fig. 3. This wheel is twenty-four (24) inches in diameter in the case noted, but may be made larger or smaller, as required by the size of the tub. The wheel is protected by an iron tire, as shown in Fig. 3.

D represents a washer or bushing, to be used in place of the wheels when said wheels are detached, as hereinafter noted, and serve to keep the bail B in place.

E and F represent the link and upright arm on the upper edge of the tub, and are used to connect the loose part of the bail with the body of the tub, and serve to steady the tub when it is loaded.

G represents the iron arms, projecting horizontally from two opposite sides of the tub. These arms serve a double purpose, as they are used to hang the body of the tub onto the bail, and, in being made longer than the ordinary arms, serve as an axle for the wheels C.

H represents the nuts, secured onto the outer end of the arm or axle G, and serve to hold the bail and wheels in place, or, if the wheels are detached, will hold the bail and washers in place.

I represents the iron runners in common use on wooden coal-tubs. The rim of the wheels, extending below the runners on the bottom of the tub, makes the tub very much easier to handle, as in the case where the runners only are used it takes two men to drag the tub when the coal in the vessel being discharged is away from the hatch, whereas with my wheels attached the tub can be very easily handled by one man in any part of the vessel, thus saving labor and expense.

I am well aware that there are already tubs in use with wheels attached; but they are either fastened onto the bottom of the tub or else set into the bottom, and in either case are objectionable, as the following explanation will show. If the wheels are set onto the bottom of the tub, they raise the upper edge of the tub so high that the man filling it works at a great disadvantage through being obliged to lift his shovel so much higher in the process of filling than he does in the case of the ordinary coal-tub, or in case my wheels are used, as the edge or rim of my wheels, only projecting far enough below the lower edge of the tub to clear it from surface obstructions, will therefore overcome this objection. Another objection is that the wheels on the bottom of a tub are only from four to eight inches diameter, whereas mine, being twenty-four inches diameter, make it easier to handle the tub, as the larger the wheel is the more propelling-power there is to it. If the wheels are set into the bottom of a tub, they will weaken the bottom, as the continual dropping of the tub onto any hard surface has a tendency to push the wheels up through the bottom of the tub, whereas my wheels, being fastened by a stout arm or axle to the side of the tub, will overcome this objection. Another objection is that there is so little space between the wheel and where it is set into the tub that there is no chance to get any oil onto the bearings, and in a short time the wheels get clogged up by coal-dirt, and as wheels become practically useless, and as mine may be oiled as readily as a carriage-wheel, they are an improvement in this respect.

The wheels may be detached, as shown in Fig. 3, when commencing to discharge a vessel, and when no wheels are needed at all, as in the case of coal-steamers, when said steamers are more than half discharged before the men have to work away from the hatch, and the tub without the wheels is as light as the ordinary coal-tub. The wheels may be detached or replaced in a very few seconds, and I claim that this ability to so detach them is a great improvement, as it cannot be done in the case of the ordinary wheels now in use.

The washer or bushing takes the place of the wheels when they are detached, as before stated.

Having thus described my invention, what I claim is—

The combination, with a coal-tub having the side arms or axles adapted to receive the bail, of the removable wheels, substantially as set forth.

JULIUS R. ROOKS.

In presence of—
THOMAS DOHERTY,
FRANK H. WARNER.